United States Patent
Stransky et al.

(10) Patent No.: US 8,907,222 B2
(45) Date of Patent: Dec. 9, 2014

(54) ADJUSTABLE COVER FOR CONDUCTORS AND INSULATORS

(71) Applicant: Preformed Line Products, Mayfield Village, OH (US)

(72) Inventors: Mark Stransky, Munroe Falls, OH (US); Keith Miller, Twinsburg, OH (US); Mark Burns, Macedonia, OH (US); Robert Peterson, Chardon, OH (US); Bryan Casenhiser, Twinsburg, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 105 days.

(21) Appl. No.: 13/843,059

(22) Filed: Mar. 15, 2013

(65) Prior Publication Data

US 2014/0262434 A1    Sep. 18, 2014

(51) Int. Cl.
*H01R 4/70*    (2006.01)
*H02G 1/00*    (2006.01)
*H02G 3/04*    (2006.01)

(52) U.S. Cl.
CPC ............... *H02G 3/0418* (2013.01); *H02G 1/00* (2013.01)
USPC ................ 174/138 F; 174/137 R; 174/138 G; 174/40 R; 174/138 B; 361/626; 248/49; 52/101

(58) Field of Classification Search
USPC ....... 174/137 R, 138 B, 138 R, 138 E, 138 G, 174/40 R, 178, 163 R, 148, 138 F; 361/626; 248/49, 74.4; 52/101
See application file for complete search history.

(56) References Cited

U.S. PATENT DOCUMENTS

| 4,234,753 A | 11/1980 | Clutter |
| 5,446,242 A * | 8/1995 | Barrett ...................... 174/140 R |
| 6,730,852 B1 * | 5/2004 | Puigcerver et al. ........ 174/138 F |
| 7,884,285 B2 * | 2/2011 | Spencer .................... 174/138 F |

FOREIGN PATENT DOCUMENTS

| DE | 4115866 A1 | 11/1992 |
| DE | 20314164 U1 | 12/2003 |

OTHER PUBLICATIONS

Int. Search Report cited in PCT Application No. PCT/US2014/023380 dated Jul. 1, 2014, 9 pgs.

* cited by examiner

*Primary Examiner* — Dhirubhai R Patel
(74) *Attorney, Agent, or Firm* — Cooper Legal Group, LLC (57) ABSTRACT

A cover apparatus can cover an electrical insulator and an electrical conductor. The cover apparatus includes one or more leg sections for covering a portion of the electrical conductor. The cover apparatus includes a cover section coupled to the one or more leg sections and covering a portion of the electrical insulator. The cover section includes a body portion and an adjustable portion coupled to the body portion at a coupling location. The adjustable portion can be adjusted such that a dimension of the adjustable portion is adjusted according to a dimension of the electrical insulator. An example method of forming a cover apparatus for covering an electrical insulator and an electrical conductor is also provided.

20 Claims, 11 Drawing Sheets

ADJUSTABLE COVER FOR CONDUCTORS AND INSULATORS

TECHNICAL FIELD

The instant application is generally directed towards a cover apparatus. For example, the instant application is directed towards a cover apparatus for covering an electrical insulator and an electrical conductor.

BACKGROUND

Wildlife, including avian wildlife (e.g., birds, raptors, eagles, etc.) can perch or otherwise come into contact with electrical insulators and energized conductors, which can, among other things, compromise reliability and stability of a service offered by a utility and/or harm the wildlife.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a cover apparatus is provided for covering an electrical insulator and a conductor. The cover apparatus comprises one or more leg sections configured to cover a portion of the electrical conductor. A cover section is coupled to the one or more leg sections and is configured to cover a portion of the electrical insulator. The cover section comprises a body portion and an adjustable portion coupled to the body portion at a coupling location. The adjustable portion is configured to be adjusted such that a dimension of the adjustable portion is adjusted according to a dimension of the electrical insulator.

In an example, a cover apparatus is provided for covering an electrical insulator and a conductor. The cover apparatus comprises a first leg section configured to cover a first portion of the electrical conductor and a second leg section configured to cover a second portion of the electrical conductor. The cover apparatus comprises a cover section coupled to the first leg section and the second leg section and configured to cover a portion of the electrical insulator. The cover section comprises a body portion and an adjustable portion coupled to the body portion at a coupling location. The adjustable portion is configured to be adjusted such that a dimension of the adjustable portion is adjusted according to a dimension of the electrical insulator.

In an example, a method of forming a cover apparatus for covering an electrical insulator and an electrical conductor is provided. The method comprises a method of forming a cover apparatus for covering an electrical insulator and an electrical conductor. The method comprises providing a cover section of the cover apparatus and one or more leg sections of the cover apparatus. The cover section is coupled to the one or more leg sections of the cover apparatus. The cover section is configured to cover a portion of the electrical insulator and the one or more leg sections are configured to cover a portion of the electrical conductor. The cover section comprises a body portion and an adjustable portion coupled to the body portion at a coupling location. The adjustable portion is configured to be adjusted such that a length of the adjustable portion, as measured from the coupling location to a distal end of the adjustable portion, is adjusted according to a dimension of the electrical insulator. The method comprises removing a separable section from the adjustable portion to reduce the length of the adjustable portion according to the dimension of the electrical insulator.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

Figure 1:
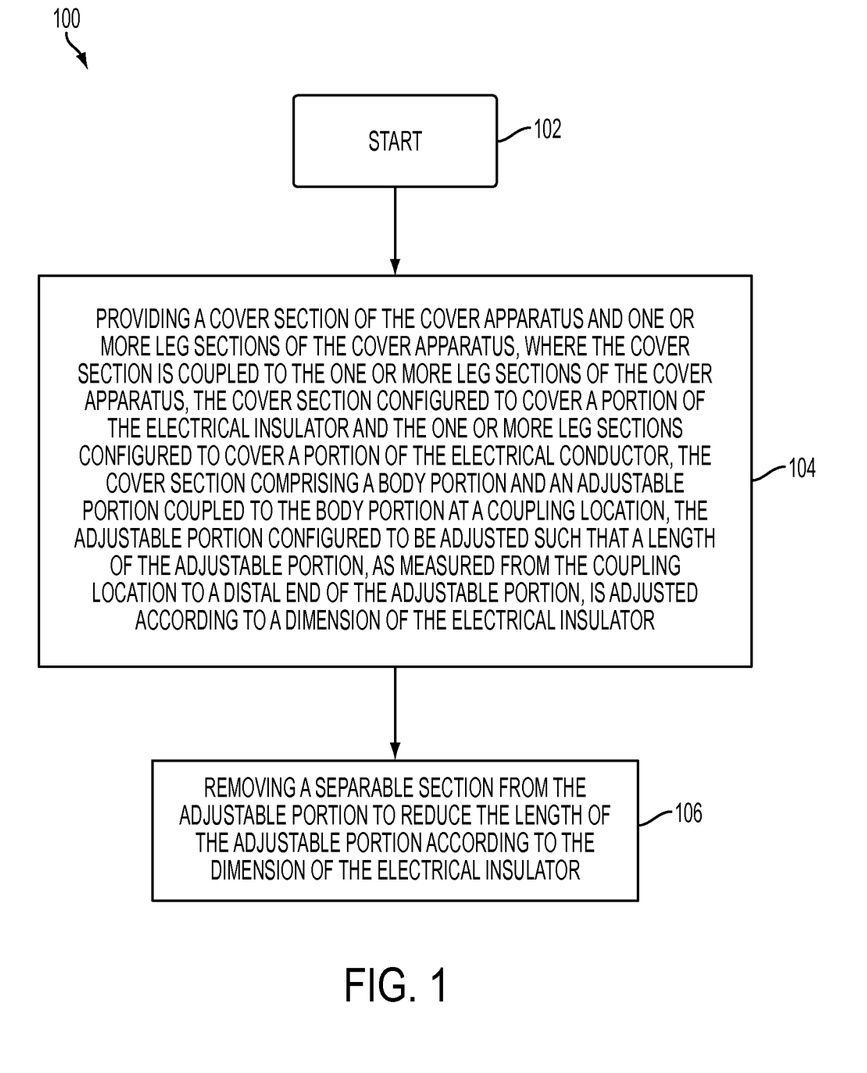
FIG. 1 is a flow diagram illustrating an example method of forming a cover apparatus for covering an electrical insulator and electrical conductor.

Turning to FIG. 1, an example method 100 of forming a cover apparatus is illustrated. The method 100 can be used in association with some or all of the features illustrated in FIGS. 2 to 11. At 102, the method 100 starts. At 104, a cover section of the cover apparatus is provided along with one or more leg sections of the cover apparatus. The cover section can be coupled to the one or more leg sections. The cover section can cover a portion of the electrical insulator and the one or more leg sections can cover a portion of the electrical conductor. The cover section can comprise a body portion and an adjustable portion coupled to the body portion at a coupling location. The adjustable portion can be adjusted such that a length of the adjustable portion, as measured from the coupling location to a distal end of the adjustable portion, is adjusted according to a dimension of the electrical insulator. At 106, a separable section can be removed from the adjustable portion to reduce the length of the adjustable portion according to the dimension of the electrical insulator.

Figure 2:
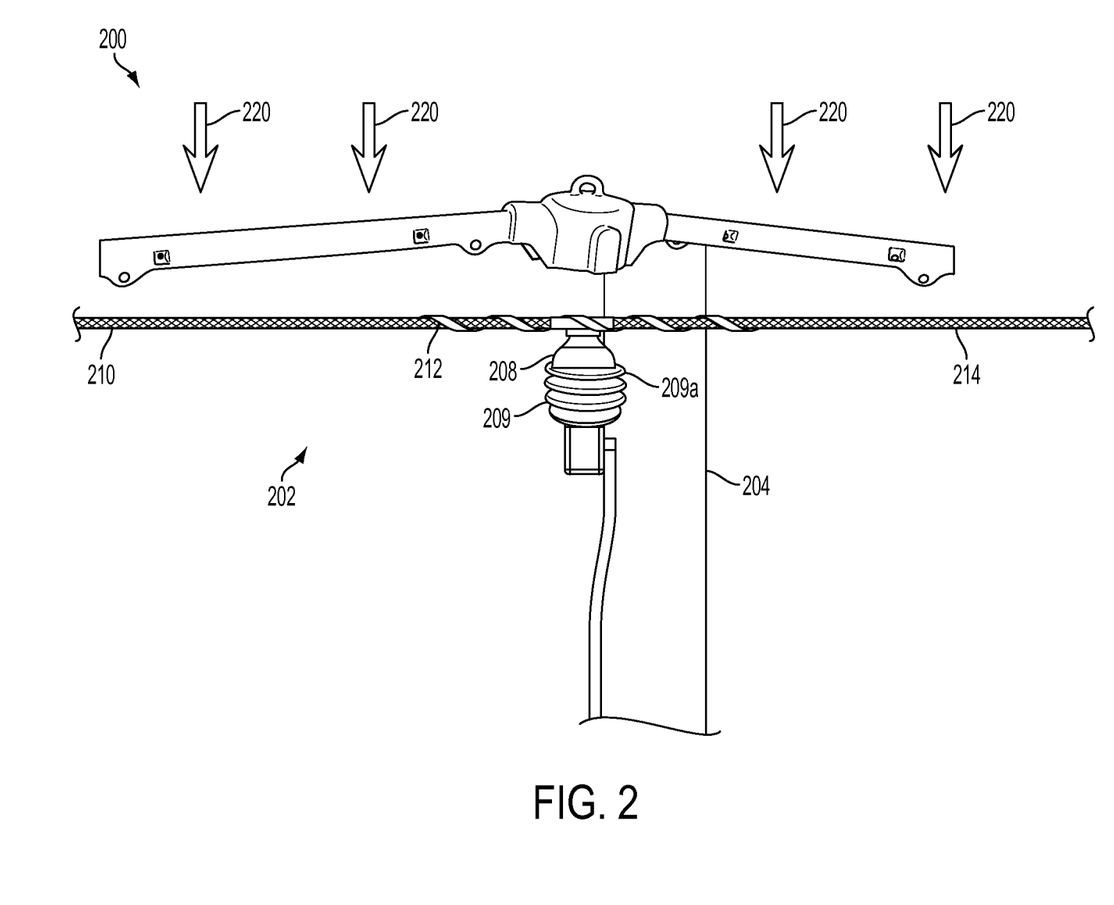
FIG. 2 is an illustration of an example cover apparatus in a removed/detached state from an electrical structure.

Turning now to FIG. 2, a cover apparatus 200 is illustrated for covering an electrical structure 202, including an electrical insulator 208 and an electrical conductor 210. The cover apparatus 200 is illustrated in a partially detached state from the electrical structure 202 so as to more clearly illustrate the features of the cover apparatus 200 and the electrical structure 202. In general, the cover apparatus 200 can cover the electrical structure 202 to provide at least some degree of protection to birds, raptors, eagles and/or other wildlife. For example, the cover apparatus 200 can comprise a non-conductive material, such as plastics, composites, etc.

The electrical structure 202 is somewhat generically/schematically illustrated, as the electrical structure 202 includes any number of sizes, shapes, structures, and configurations. In an example, the electrical structure 202 includes a utility pole 204. The utility pole 204 can support power lines, cables, fiber optic cables, transformers, street lights, or any other type of equipment. The utility pole 204 can include materials such as wood, metal, concrete, composites (e.g., fiberglass, etc.) or the like.

The utility pole 204 can support the electrical insulator 208. The electrical insulator 208 can withstand operating voltage and electrical surges. The electrical insulator 208 can include any number of materials. In an example, the electrical insulator 208 includes porcelain, though other materials are envisioned, including ceramic, glass, polymers, or the like. While the utility pole 204 is illustrated to support one electrical insulator 208 in this example, the utility pole 204 could likewise support multiple electrical insulators 208 in other examples.

The electrical insulator 208 can extend along a substantially vertical axis with respect to a surface of a material(s) into which the utility pole 204 is inserted, mounted, etc. (e.g., pavement, concrete, earth, etc.). The electrical insulator 208 can include one or more sheds 209 that project radially outwardly from a center of the electrical insulator 208. Any number of sheds 209 can be provided (e.g., more than or less than as illustrated in FIG. 2). Likewise, the sheds 209 can include any number of dimensions, such as by being larger or smaller than as illustrated, being closer together, etc.

The electrical insulator 208 can support at least one electrical conductor 210. The electrical conductor 210 can allow for current to flow through the electrical conductor 210 so as to supply electricity. The electrical conductor 210 can include wires, cables, electrical lines, or nearly any type of structure capable of allowing for current to flow therethrough. The electrical conductor 210 is not limited to the illustrated dimensions, and could have a larger or smaller cross-sectional thickness than as illustrated. Likewise, the electrical conductor 210 can extend a longer distance than as illustrated, as only a portion of the electrical conductor 210 is illustrated.

In an example, the electrical conductor 210 includes a first portion 212 and a second portion 214. The first portion 212 of the electrical conductor 210 can be disposed on one side of the electrical insulator 208 while the second portion 214 of the electrical conductor 210 can be disposed on an opposing second side of the electrical insulator 208. The first portion 212 and second portion 214 can extend a longer or shorter distance than as illustrated. As will be described in more detail below, the first portion 212 and second portion 214 can extend generally coaxially with each other along a linear axis. In other examples, however, the first portion 212 and second portion 214 can extend along axes that are non-coaxial with each other.

As illustrated by the directional arrows 220, the cover apparatus 200 can be applied to the electrical structure 202 so as to cover the electrical insulator 208 and the electrical conductor 210. In an example, the directional arrows 220 are illustrated as being oriented in a downward direction, such as substantially perpendicular to a surface of a material(s) into which the utility pole 204 is inserted, mounted, etc. (e.g., pavement, concrete, earth, etc.). In an example, however, the cover apparatus 200 is not limited to being moved along the directional arrows 220 in the downward direction. Rather, the cover apparatus 200 can be applied to the electrical structure 202 from an angle relative to the surface of the material.

Figure 3:
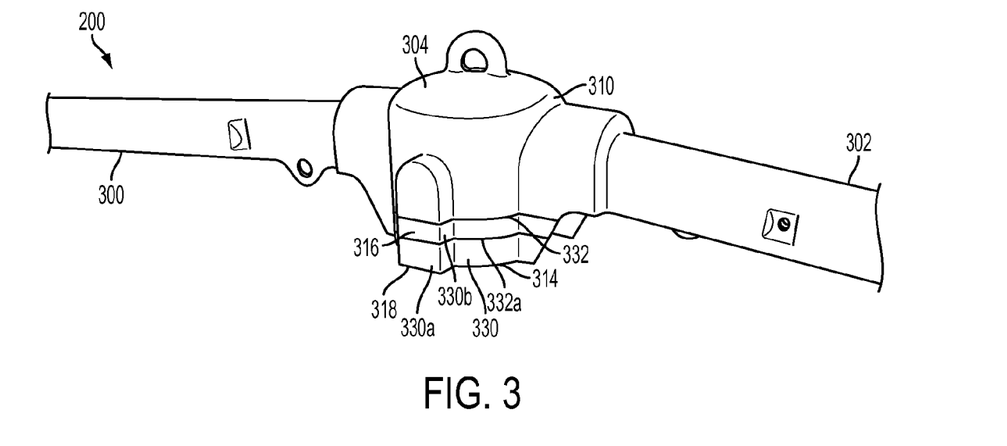
FIG. 3 is an illustration of an example cover apparatus.

Turning now to FIG. 3, the cover apparatus 200 is illustrated in more detail. While only a portion of the cover apparatus 200 is illustrated in this example for ease of illustration, the cover apparatus 200 can be longer or shorter in length than as illustrated, such as by having a length similar to that illustrated in FIG. 2. In an example, the cover apparatus 200 can include a length of approximately 2 meters (e.g., ~80 inches). In other examples, however, the cover apparatus 200 could be longer or shorter, and is not limited to the dimensions disclosed herein.

The cover apparatus 200 includes one or more leg sections. In an example, the one or more leg sections include a first leg section 300 and a second leg section 302. The first leg section 300 can cover at least a first portion 212 of the electrical conductor 210. The first leg section 300 can be generally hollow so as to support/receive structures therein. In an example, the first leg section 300 can receive the first portion 212 of the electrical conductor 210 therein. It is to be appreciated that the first leg section 300 can extend a longer or shorter distance than as illustrated herein, such that the first leg section 300 can cover a longer or shorter portion of the first portion 212.

The second leg section 302 can cover at least a second portion 214 of the electrical conductor 210. The second leg section 302 can be generally hollow so as to support/receive structures therein. In an example, the second leg section 302 can receive the second portion 214 of the electrical conductor 210 therein. It is to be appreciated that the second leg section 302 can extend a longer or shorter distance than as illustrated herein, such that the second leg section 302 can cover a longer or shorter portion of the second portion 214.

The cover apparatus 200 includes a cover section 304. The cover section 304 can be coupled to the one or more leg sections and cover a portion of the electrical insulator 208 and/or a portion of the electrical conductor 210. For example, the cover section 304 can be coupled to the first leg section 300 on one side and to the second leg section 302 on an opposing second side. In the illustrated example, the first leg section 300 and second leg section 302 can be coupled to the cover section 304 such that the first leg section 300 and second leg section 302 are generally coaxial with each other. In other examples, however, the first leg section 300 and second leg section 302 can be coupled with respect to the cover section 304 at any degree of angles, such as by extending substantially non-coaxially with respect to each other, or the like. In an example, the cover section 304 can be integrally formed with the first leg section 300 and the second leg section 302, such that the cover section 304 and the one or more leg sections are generally a composite structure. In an example, the cover section 304 and one or more leg sections can be separately attached to each other, such as by adhesives, mechanical fasteners, molding, etc.

The cover section 304 can include a body portion 310. In an example, the body portion 310 is a rounded, generally circularly shaped structure with a hollow center portion. The body portion 310 is sized and shaped so as to receive at least a portion of the electrical insulator 208 therein. In an example, the body portion 310 can be large enough so as to receive the electrical insulator 208 therein, such that the body portion 310 may be larger or slightly larger in size than the electrical insulator 208. The body portion 310 is not limited to the generally circular shape that is illustrated. Rather, the body portion 310 can instead include quadrilateral shapes (e.g., square, rectangular, etc.), oval shapes, or the like. Likewise, the body portion 310 can be larger or smaller in size than as illustrated, depending, at least in part, on the size(s) of the electrical insulator 208 and/or the electrical conductor 210.

The cover section 304 can include an adjustable portion 314. The adjustable portion 314 can be coupled to the body portion 310 at a coupling location 316. The adjustable portion 314 can extend between the coupling location 316 at one end to a distal end 318 at an opposing end. In an example, the adjustable portion 314 can be integrally formed with the body portion 310, such that the adjustable portion 314 and the body portion 310 are generally a composite structure. In an example, the adjustable portion 314 and the body portion 310 can be separately attached to each other, such as by adhesives, mechanical fasteners, molding, etc.

The adjustable portion 314 can be adjusted such that a dimension of the adjustable portion can be adjusted according to a dimension of the electrical insulator 208. In an example, the dimension of the adjustable portion 314 corresponds to a length of the adjustable portion 314 as measured from the coupling location 316 to the distal end 318 of the adjustable portion 314. The adjustable portion 314 can include one or more separable sections 330. As illustrated, the separable sections 330 include a plurality of separable sections, though the adjustable portion 314 is not so limited. For example, the adjustable portion 314 can include greater than or less than the number of separable sections 330 illustrated in FIG. 3. In an example, the length of the adjustable portion 314 can be substantially perpendicular to an axis along which the electrical conductor 210 extends.

The separable sections 330 can be spaced apart along the length of the adjustable portion 314. In an example, the separable sections 330 can be separated from adjacent separable sections 330 by a separating mark 332. In an example, the separating marks 332 can extend generally around the adjustable portion 314. The separating marks 332 can define a weakened portion, such as by comprising a thinner wall portion than surrounding portions of the adjustable portion 314. In other examples, the separating marks 332 can include one or more perforations and/or punctures extending through the adjustable portion 314. As such, in an example, the separating marks 332 can allow for relatively easier removal of some of the separable sections 330, such as by cutting or breaking along the separating marks 332. The separating marks 332 are not so limited, however, and in other examples, need not include a weakened portion, perforation, or the like. Rather, the separating marks 332 can instead include a visual guide (e.g., drawn line, guide line, etc.) indicating where a user can cut, for example, to remove one or more of the separable sections 330.

Upon removal of the separable section(s) 330, the length of the adjustable portion 314 can be reduced. For example, the separable sections 330 can comprise a first separable section 330a separated from a second separable section 330b by a first separating mark 332a. In operation, a user can reduce the length of the adjustable portion 314 by removing the first separable section 330a. The user can remove the first separable section 330a, such as by making a cut, a break, or the like along the first separating mark 332a. The user can similarly reduce the length of the adjustable portion 314 to a greater degree by removing more than one separable section 330.

Figure 4:
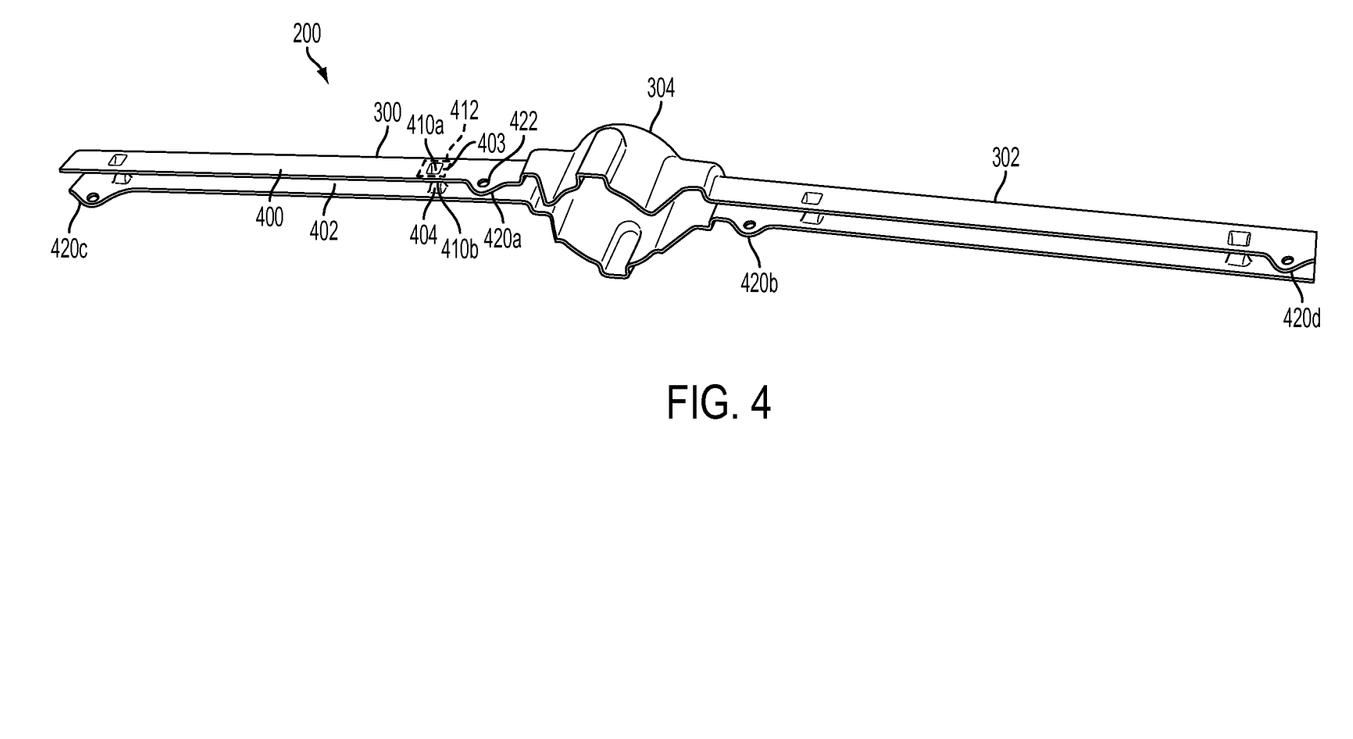
FIG. 4 is an illustration of an underside of an example cover apparatus.

Turning now to FIG. 4, an underside view of the cover apparatus 200 is illustrated. The cover apparatus 200 includes a first wall 400 and a second wall 402. The first wall 400 and second wall 402 can extend along and at least partially form the first leg section 300, the cover section 304, and second leg section 302. The first wall 400 and second wall 402 extend generally parallel to each other and are spaced apart to define a hollow interior that is sized/shaped to receive the electrical insulator 208 and/or the electrical conductor 210.

The cover apparatus 200 can include one or more securing portions. In an example, the securing portions can include a first securing portion 403 in the first wall 400 and a second securing portion 404 in the second wall 402. The first securing portion 403 and second securing portion 404 can be formed in either or both of the first leg section 300 or second leg section 302. The first securing portion 403 and second securing portion 404 can, together, secure the cover apparatus 200 to the electrical conductor 210. In the illustrated example, the cover apparatus 200 can include a total of eight securing portions (e.g., four (4) first securing portions 403 and four (4) second securing portions 404). In other examples, however, any number of securing portions can be provided.

The one or more securing portions can include one or more attachment openings 410. In the illustrated example of FIG. 4, the attachment openings 410 include a first attachment opening 410a and a second attachment opening 410b. The first attachment opening 410a can be formed in the first securing portion 403 while the second attachment opening 410b can be formed in the second securing portion 404.

The attachment openings 410 can each include an opening extending through a pair of walls. For instance, the first attachment opening 410a can extend through the first wall 400 while the second attachment opening 410b can extend through the second wall 402. The attachment openings 410 can receive a securing item 1100 (e.g., illustrated and described with respect to FIG. 11) to secure and maintain the electrical conductor 210 within the cover apparatus 200. In an example, the securing item 1100 can be placed into the first attachment opening 410a and the second attachment opening 410b to couple the first securing portion 403 to the second securing portion 404. As such, the securing item 1100 can secure the cover apparatus 200 to the electrical conductor 210.

In the illustrated example, the attachment openings 410 can project inwardly towards a center of the cover apparatus 200, so as to grip and hold the electrical conductor 210 therein. For example, the walls may be somewhat rigid and may comprise indentations wherein the attachment openings 410 are formed. A space between opposing indentations in opposing walls may be slightly less than a diameter of the electrical conductor 210 such that opposing indentations apply a bias or (e.g., frictional) force against the electrical conductor when the electrical conductor 210 is situated in the space between opposing indentations. In an example, to install the cover apparatus 200 onto the electrical conductor 210 the cover apparatus is (e.g., forcibly) pulled onto the electrical conductor 210 (e.g., 'snapped' down over, onto, etc. the electrical conductor) such that the electrical conductor 210 passes through the somewhat narrow spaces between opposing indentations. As such, once the cover apparatus 200 is installed, the indentations facilitate maintaining the cover apparatus 200 on the electrical conductor 210.

The attachment openings 410 can include a relief portion 412 formed in one of the walls adjacent one of the securing portions (e.g., first securing portion 403 or second securing portion 404). In an example, the relief portion 412 can be formed in the first wall 400 of the first leg section 300 adjacent to the first securing portion 403. The relief portion 412 can define a cut, perforated, or punctured area, for example, surrounding the attachment openings 410. The relief portion 412 is depicted somewhat generically/schematically in FIG. 4. In an example, the relief portion 412 includes a quadrilateral shape (e.g., rectangular, square, etc.), though other shapes, such as circular, oval, etc. are envisioned. The relief portion 412 can allow for at least some degree of flexibility to an area surrounding the attachment openings 410. Such flexibility can allow for bending/flexing when the cover apparatus 200 is pulled downwardly onto the electrical conductor 210. For example, the relief portion 412 can flex outwardly in response to contacting/engaging the electrical conductor 210, before flexing back into place when the electrical conductor 210 is received within the cover apparatus 200. In an example, the relief portion 412 can be formed in the first wall 400 surrounding the first attachment opening 410a. As such, the securing item 1100 can be inserted from the first wall 400 to the second wall 402. In this manner, the relief portion 412 allows for flexing/bending in the first wall 400 as the cover apparatus 200 is installed on to the electrical conductor 210 but does not 'flex away from' the securing item 1100 during installation of the securing item.

The cover apparatus 200 can include one or more gripping structures 420 located in the first leg section 300 and/or second leg section 302. The gripping structures 420 can be supported by the walls. In an example, a first gripping structure 420a can be supported by the first wall 400 while a second gripping structure 420b can be supported by the second wall 402. As illustrated, the gripping structures 420 can be positioned on opposing walls. Along these lines, a third gripping structure 420c can be supported by the second wall 402 while a fourth gripping structure 420d can be supported by the first wall 400. The cover apparatus 200 is not specifically limited to the gripping structures 420 being located on alternating walls. Rather, in an example, the gripping structures 420 could instead be positioned on walls on the same side (e.g., the first wall 400 or the second wall 402).

At least some of the gripping structures 420 include a gripping opening 422. The gripping opening 422 can allow for a structure, such as an insulated pole (e.g., "hot stick") or the like, to grip the gripping structures 420 through the gripping opening 422. In the illustrated example, due to the gripping structures 420 being located on opposing walls, the insulated pole can more easily provide a downward, pulling force to the cover apparatus 200 on both sides of the electrical insulator 208 and electrical conductor 210. This downward, pulling force is sufficient to cause the relief portion 412 to flex outwardly so as to receive the electrical conductor 210 within the cover apparatus 200. As such, the first gripping structure 420a and the second gripping structure 420 can facilitate installation of the cover apparatus 200 onto the electrical conductor 210.

Figure 5:
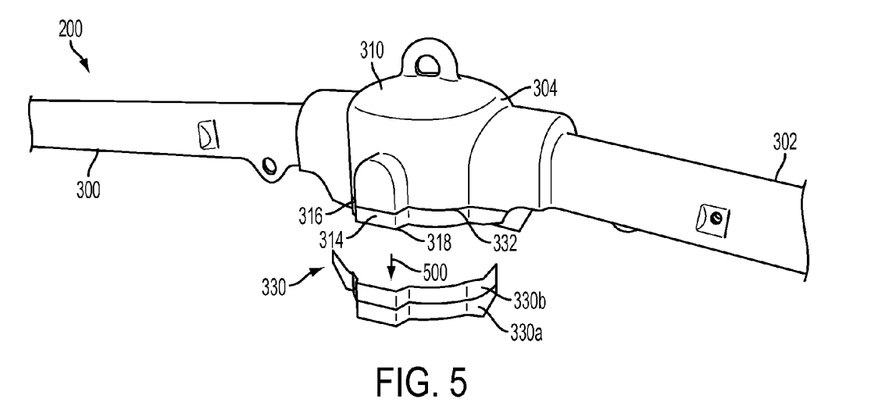
FIG. 5 is an illustration of an example cover apparatus having a separable section of an adjustable portion removed.

Turning now to FIG. 5, an example of a method of forming the cover apparatus 200 is illustrated. In this example, the adjustable portion 314 of the cover apparatus 200 can be adjusted such that a dimension of the adjustable portion 314 is adjusted according to a dimension of the electrical insulator 208. In an example, the first separable section 330a and second separable section 330b can be removed (e.g., illustrated generically/schematically with arrowhead 500) from the adjustable portion 314. The first separable section 330a and second separable section 330b can be separated from the adjustable portion 314 in any number of ways, such as by cutting, breaking, etc. along the separating mark 332. As such, the dimension, for example, the length, of the adjustable portion 314 can be adjusted and reduced as measured from the coupling location 316 to the distal end 318 of the adjustable portion 314.

Figure 6:
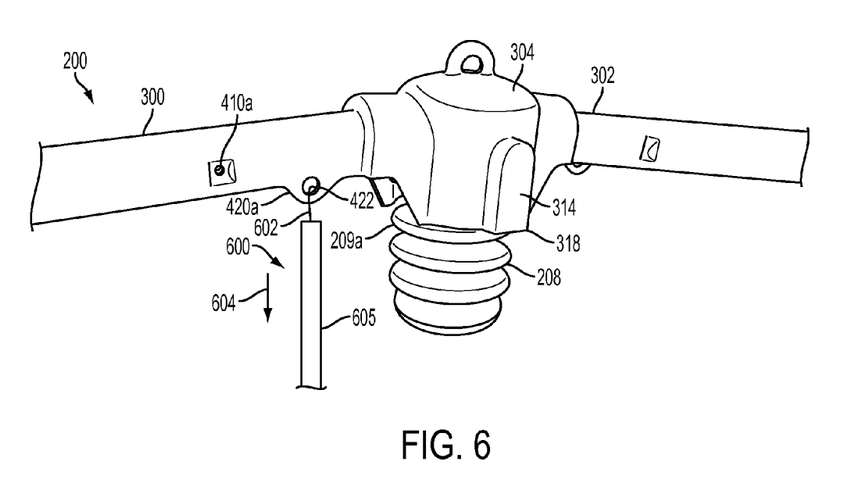
FIG. 6 is an illustration of an example cover apparatus attached to an electrical structure.

Turning now to FIG. 6, the cover apparatus 200 can be fully attached to the electrical structure 202. In this example, a portion of the cover apparatus 200 in association with the electrical insulator 208 and electrical conductor 210 is illustrated. In operation, however, the cover apparatus 200 can be larger than as illustrated in FIG. 6, such as by having dimensions similar to the example illustrated in FIG. 2.

The cover apparatus 200 can be fully attached to the electrical structure 202 such that the cover section 304 extends substantially 360° around the portion of the electrical insulator 208. The adjustable portion 314 can be dimensionally adjusted (e.g., before and/or after being attached to the electrical structure) to include any number of lengths. In an example, the adjustable portion 314 can be dimensionally adjusted such that the distal end 318 of the adjustable portion 314 is in proximity to the sheds 209 of the electrical insulator 208. For example, the distal end 318 can be in proximity to a first shed 209a without covering or blocking the first shed 209a. In other examples, however, the adjustable portion 314 can extend a longer or shorter distance than as illustrated. In the illustrated example, the cover section 304 can extend along a substantially vertical axis. It will be appreciated that although the cover section extends substantially 360° around the portion of the electrical insulator 208, at least some of the electrical insulator may remain accessible, such as through an underside of the cover section. That is, in some embodiments, the electrical insulator 208 is not completely enveloped by the cover apparatus 200. Rather, at least some of the electrical insulator 208 may be accessed even when the cover apparatus 200 is installed.

In this example, to attach the cover apparatus 200 to the electrical structure 202, an insulated pole 600 can be used. The insulated pole 600 is somewhat generically/schematically depicted, as the insulated pole 600 includes any number of sizes/shapes/constructions (e.g., longer or shorter in length, etc.). The insulated pole 600 can be handled and operated by a user.

The insulated pole 600 includes a hooked portion 602. The hooked portion 602 is disposed at an end of the insulated pole 600. The hooked portion 602 is sized to be received within the gripping openings 422 of the gripping structure 420. In this example, the hooked portion 602 of the insulated pole 600 is illustrated as engaging the first gripping structure 420a, though the insulated pole 600 can similarly engage the second gripping structure 420b, third gripping structure 420c, and/or fourth gripping structure 420d, etc. In this example, the user can exert a pulling force 604 on the cover apparatus 200. The pulling force 604 can, in an example, be directed downwards. The pulling force 604 is sufficient to pull the cover apparatus 200 onto the electrical structure 202 (e.g., electrical conductor 210, electrical insulator 208, etc.).

Figure 7:
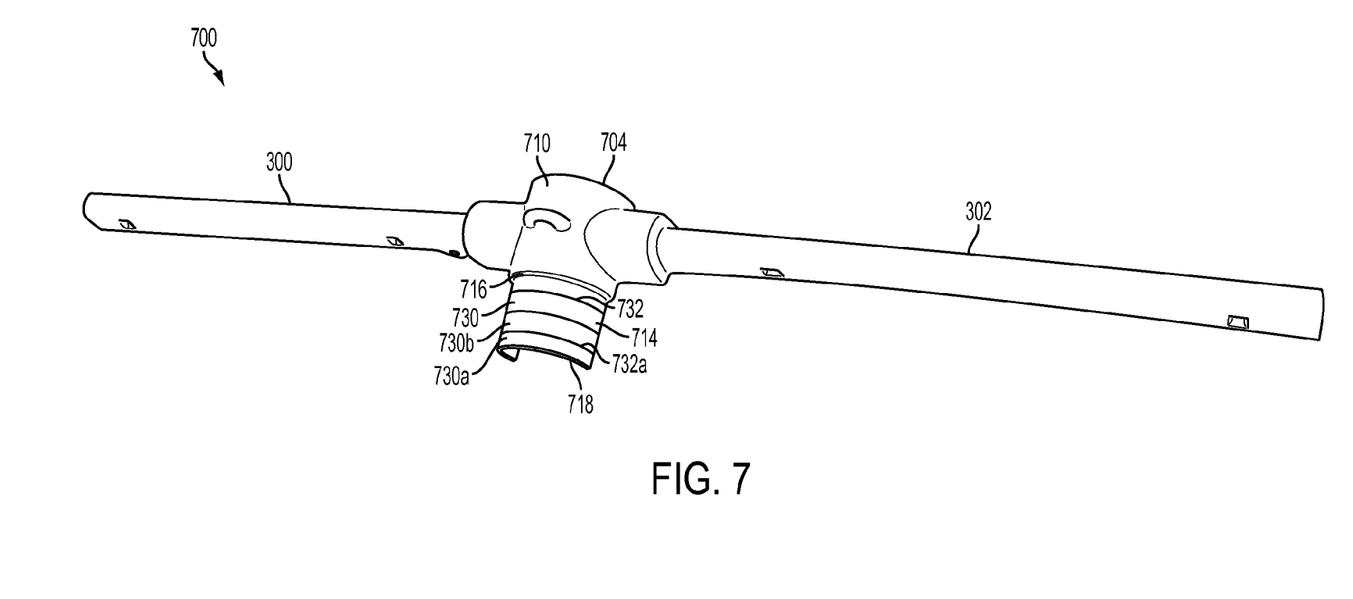
FIG. 7 is an illustration of a second example cover apparatus.

Turning now to FIG. 7, a second example cover apparatus 700 is illustrated. In this example, the second cover apparatus 700 can cover a second example electrical structure (e.g., illustrated in FIG. 10). The second cover apparatus 700 is illustrated separately from the electrical structure in this example to more clearly illustrate the features of the second cover apparatus 700. In general, the second cover apparatus 700 can cover the electrical structure to provide at least some degree of protection to birds, raptors, eagles, and/or other wildlife. For example, the second cover apparatus 700 can comprise a non-conductive material, such as plastics, composites, etc.

The second cover apparatus 700 includes the first leg section 300 and second leg section 302. The first leg section 300 and second leg section 302 are generally identical to the first leg section 300 and second leg section 302 described above with respect to the cover apparatus 200. As such, the first leg section 300 and second leg section 302 need not be described in detail again.

The second cover apparatus 700 can include a second example cover section 704. The second cover section 704 is similar to the cover section 304 but for the second cover section 704 extending along a generally horizontal axis relative to a plane of the material within which the utility pole is mounted. In the illustrated example, the second cover section 704 can cover an electrical insulator that extends along a generally horizontal axis relative to a plane of the material within which the utility pole is mounted.

The second cover section 704 can be coupled to the one or more leg sections and cover a portion of the electrical insulator and/or a portion of the electrical conductor 210. For example, the second cover section 704 can be coupled to the first leg section 300 on one side and to the second leg section 302 on an opposing second side. In an example, the first leg section 300 and second leg section 302 can be coupled to the second cover section 704 such that the first leg section 300 and second leg section 302 are generally coaxial with each other. In other examples, however, the first leg section 300 and second leg section 302 can be coupled with respect to the second cover section 704 at any degree of angles, such as by extending substantially non-coaxially with respect to each other, or the like. In an example, the second cover section 704 can be integrally formed with the first leg section 300 and the second leg section 302, such that the second cover section 704 and the one or more leg sections are generally a composite structure. In an example, the second cover section 704 and one or more leg sections can be separately attached to each other, such as by adhesives, mechanical fasteners, molding, etc.

The second cover section 704 can include a body portion 710. In an example, the body portion 710 is a rounded, generally cylindrically shaped structure with a hollow center portion. The body portion 710 is sized and shaped so as to receive at least a portion of the electrical insulator therein. In an example, the body portion 710 can have a half-cylindrical shape in which a bottom half of the cylinder is removed. The body portion 710 can be large enough so as to receive the electrical insulator therein, such that the body portion 710 may be larger or slightly larger in size than the electrical insulator. The body portion 710 is not limited to the generally circular shape that is illustrated. Rather, the body portion 710 can instead include quadrilateral shapes (e.g., square, rectangular, etc.), oval shapes, or the like. Likewise, the body portion 710 can be larger or smaller in size than as illustrated, depending, at least in part, on the size(s) of the electrical insulator and/or the electrical conductor.

The second cover section 704 can include an adjustable portion 714. The adjustable portion 714 can be coupled to the body portion 710 at a coupling location 716. The adjustable portion 714 can extend between the coupling location 716 at one end to a distal end 718 at an opposing end. For example, the adjustable portion 714 can extend along a generally horizontal axis with respect to the body portion 710. The adjustable portion 714 can be integrally formed with the body portion 710, such that the adjustable portion 714 and the body portion 710 are generally a composite structure. In an example, the adjustable portion 714 and the body portion 710 can be separately attached to each other, such as by adhesives, mechanical fasteners, molding, etc.

The adjustable portion 714 can be adjusted such that a dimension of the adjustable portion 714 can be adjusted according to a dimension of the electrical insulator. In an example, the dimension of the adjustable portion 714 corresponds to a length of the adjustable portion 714 as measured from the coupling location 716 to the distal end 718 of the adjustable portion 714. The adjustable portion 714 can include one or more separable sections 730. As illustrated, the separable sections 730 include a plurality of separable sections, though the adjustable portion 714 is not so limited. For example, the adjustable portion 714 can include greater than or less than the number of separable sections 730 illustrated in FIG. 7. In an example, the length of the adjustable portion 714 can be substantially perpendicular to an axis along which the electrical conductor 210 extends.

The separable sections 730 can be spaced apart along the length of the adjustable portion 714. In an example, the separable sections 730 can be separated from adjacent separable sections 730 by a separating mark 732. In an example, the separating marks 732 can extend generally around the adjustable portion 714. The separating marks 732 can define a weakened portion, such as by comprising a thinner wall portion than surrounding portions of the adjustable portion 714. In other examples, the separating marks 732 can include one or more perforations and/or punctures extending through the adjustable portion 714. As such, in an example, the separating marks 732 can allow for relatively easier removal of some of the separable sections 730, such as by cutting or breaking along the separating marks 732. The separating marks 732 are not so limited, however, and in other examples, need not include a weakened portion, perforation, or the like. Rather, the separating marks 732 can instead include a visual guide (e.g., drawn line, guide line, etc.) indicating where a user can cut, for example, to remove one or more of the separable sections 730.

Upon removal of the separable section(s) 730, the length of the adjustable portion 714 can be reduced. For example, the separable sections 730 can comprise a first separable section 730a separated from a second separable section 730b by a first separating mark 732a. In operation, a user can reduce the length of the adjustable portion 714 by removing the first separable section 730a. The user can remove the first separable section 730a, such as by making a cut, a break, or the like along the first separating mark 732a. The user can similarly reduce the length of the adjustable portion 714 to a greater degree by removing more than one separable section 730.

Figure 8:
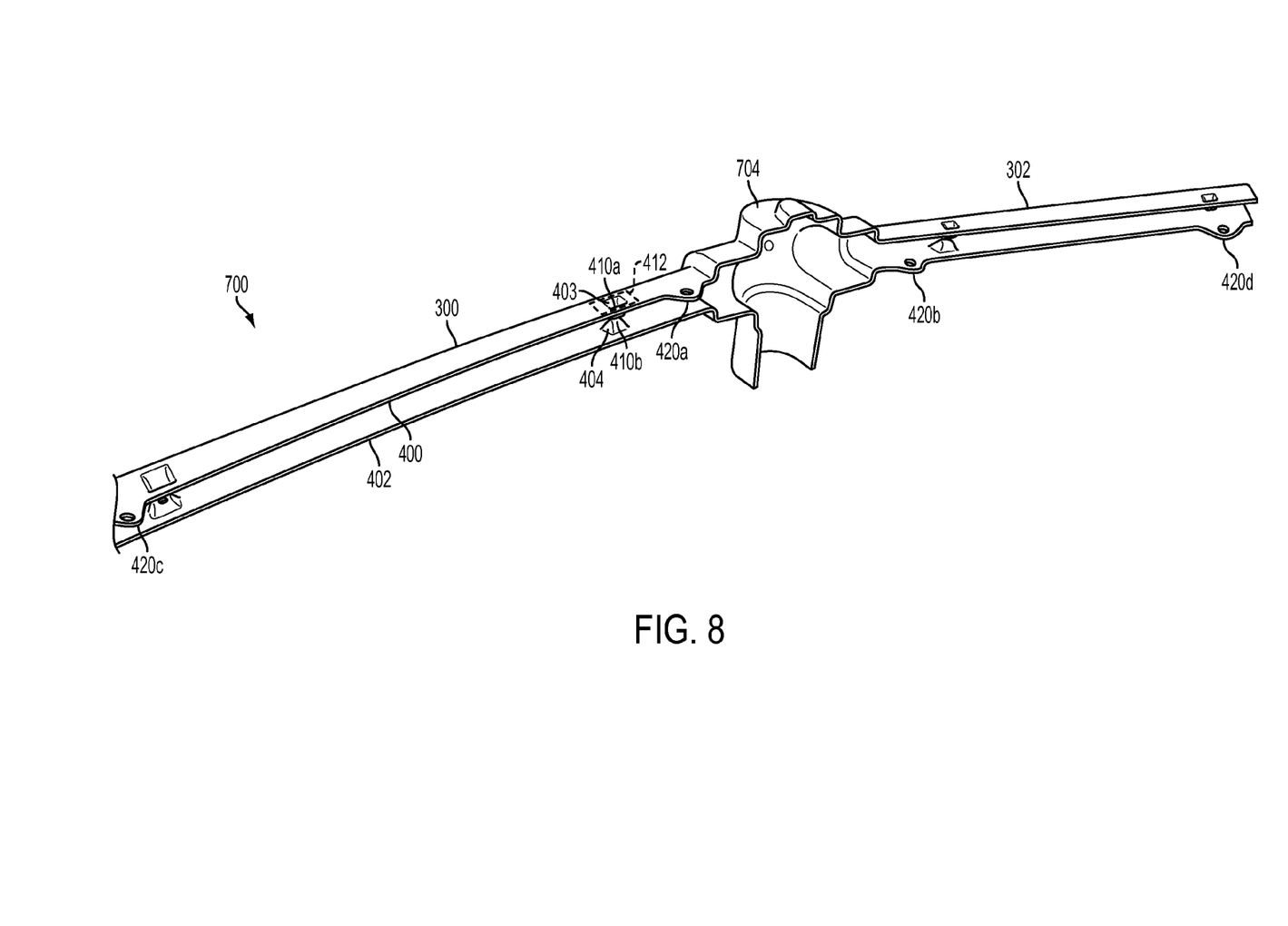
FIG. 8 is an illustration of an underside of a second example cover apparatus.

Turning now to FIG. 8, an underside view of the second cover apparatus 700 is illustrated. As with the cover apparatus 200 described above, the second cover apparatus 700 can include the first wall 400 and second wall 402. The first wall 400 and second wall 402 can be generally identical in size, shape, and construction as the first wall 400 and second wall 402 described above with respect to the cover apparatus 200.

The second cover apparatus 700 can include the securing portions and gripping structures 420 disposed in the first wall 400 and second wall 402. In an example, the securing portions include the first securing portion 403 and second securing portion 404. The first securing portion 403 and second securing portion 404 are generally identical as described above with respect to FIG. 4, and need not be described in detail again. Likewise, the gripping structures include the first gripping structure 420a, second gripping structure 420b, third gripping structure 420c, and fourth gripping structure 420d. The first gripping structure 420a and second gripping structure 420b are generally identical as described above with respect to FIG. 4, and need not be described in detail again.

Figure 9:
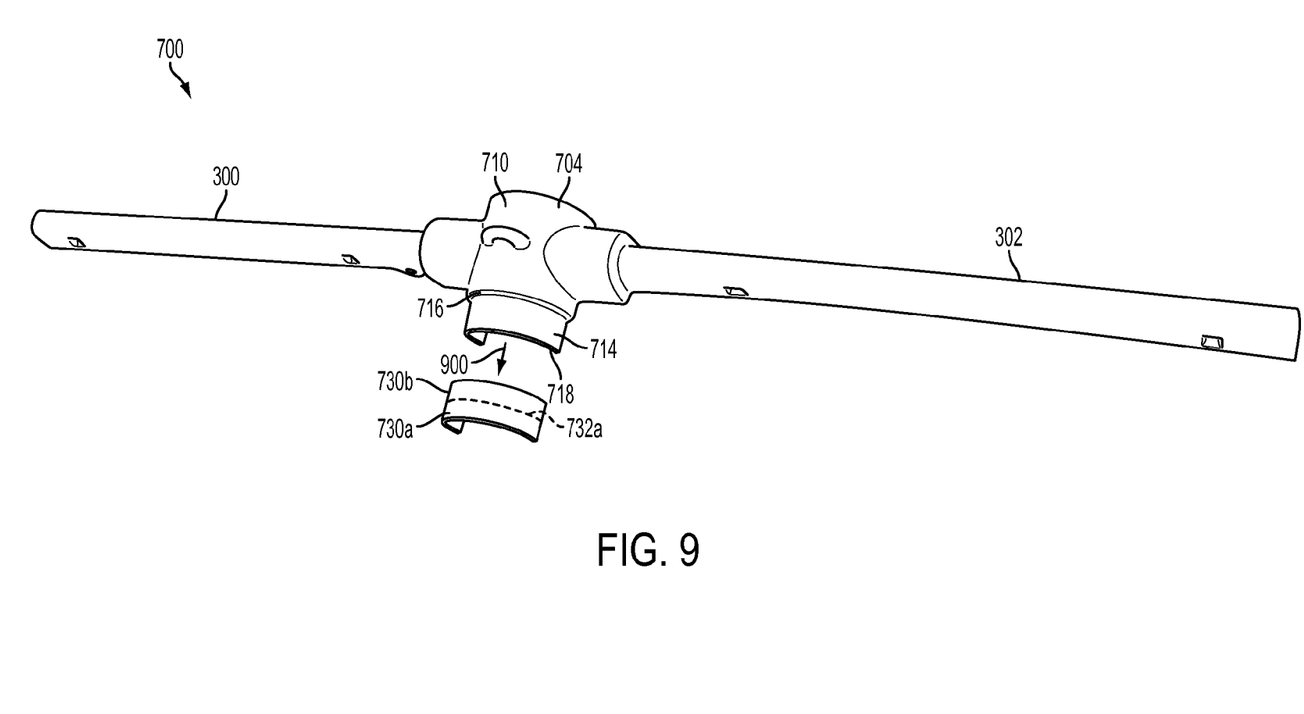
FIG. 9 is an illustration of a second example cover apparatus having a separable section of an adjustable portion removed.

Turning now to FIG. 9, an example of a method of forming the second cover apparatus 700 is illustrated. In this example, the adjustable portion 714 of the second cover apparatus 700 can be adjusted such that a dimension of the adjustable portion 714 is adjusted according to a dimension of the electrical insulator. In an example, the first separable section 730a and second separable section 730b can be removed (e.g., illustrated generically/schematically with arrowhead 900) from the adjustable portion 714. The first separable section 730a and second separable section 730b can be separated from the adjustable portion 714 in any number of ways, such as by cutting, breaking, etc. along the separating mark 732. As such, the dimension, for example, the length, of the adjustable portion 714 can be adjusted and reduced as measured from the coupling location 716 to the distal end 718 of the adjustable portion 714.

Figure 10:
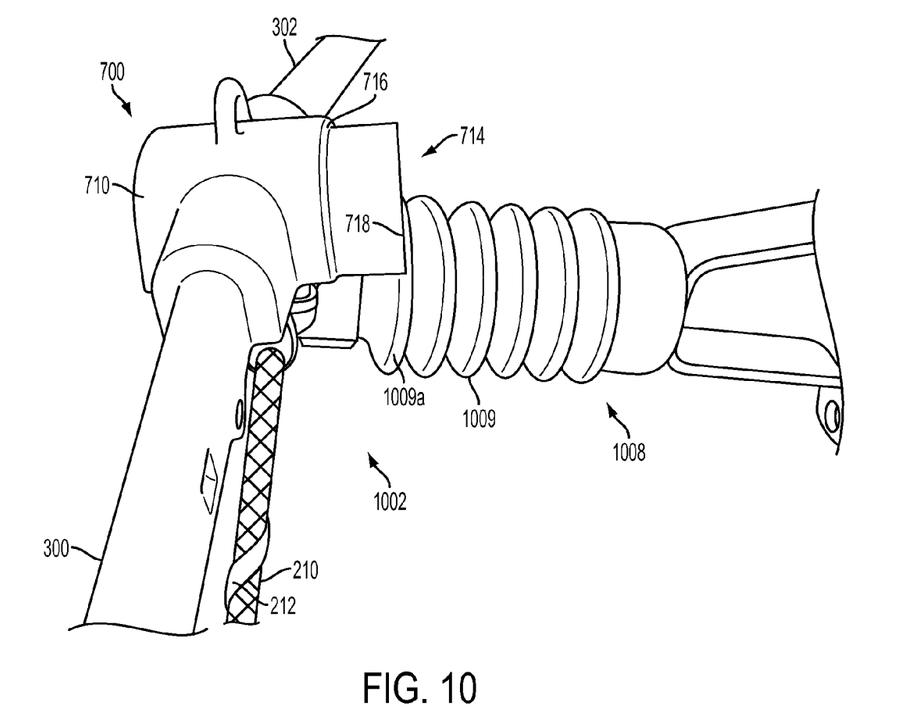
FIG. 10 is an illustration of a second example cover apparatus attached to a second example electrical structure.

Turning now to FIG. 10, the second cover apparatus 700 can be fully attached to a second example electrical structure 1002. The second electrical structure 1002 can include an electrical insulator 1008. The electrical insulator 1008 can be supported by or attached to the utility pole 204 (e.g., illustrated in FIG. 2). As with the electrical insulator 208 of FIG. 2, the electrical insulator 1008 can withstand operating voltage and electrical surges. The electrical insulator 1008 can include any number of materials, such as porcelain, ceramic, glass, polymers, or the like.

The electrical insulator 1008 can extend in a substantially horizontal direction with respect to a surface of a material(s) into which the utility pole 204 is inserted, mounted, etc. (e.g., pavement, concrete, earth, etc.). The electrical insulator 1008 can include one or more sheds 1009 that project radially outwardly from a center of the electrical insulator 1008.

The electrical conductor 210 is generally identical to the electrical conductor 210 of FIG. 2, and includes the first portion 212 and second portion 214. The first portion 212 can be disposed on one side of the electrical insulator 1008 while the second portion 214 can be disposed on an opposing side. The first portion 212 and second portion 214 can extend generally coaxially, though in other examples, may extend non-coaxially with respect to each other.

The second cover apparatus 700 can be fully attached to the second electrical structure 1002 such that the second cover apparatus 700 can extend substantially 180° around the portion of the electrical insulator 1008. The adjustable portion 714 can be dimensionally adjusted (e.g., before and/or after being attached to the electrical structure) to include any number of lengths. In an example, the adjustable portion 714 can be dimensionally adjusted such that the distal end 718 of the adjustable portion 714 is in proximity to the sheds 1009 of the electrical insulator 1008. For example, the distal end 718 can be in proximity to a first shed 1009a without covering or blocking the first shed 1009a. In other examples, however, the adjustable portion 714 can extend a longer or shorter distance than as illustrated. As with the example of FIG. 6, the insulated pole 600 can be used to attach the cover apparatus 200 to the second electrical structure 1002.

Figure 11:
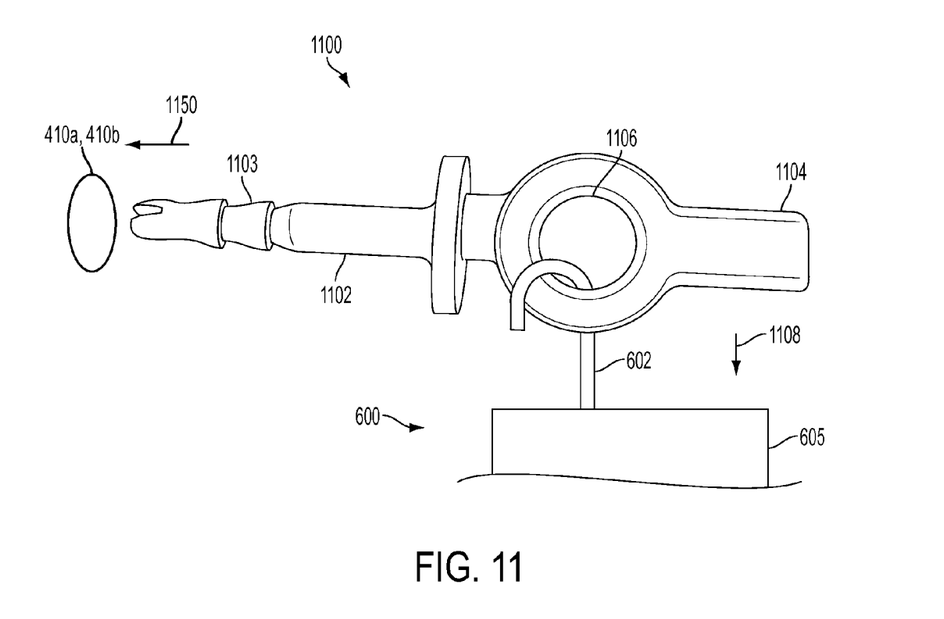
FIG. 11 is an illustration of an example securing item for securing a cover apparatus to an electrical structure.

Turning now to FIG. 11, one or more securing items 1100, such as securing pins, for example, can attach the cover apparatus 200 to the electrical structure 202 or the second cover apparatus 700 to the second electrical structure 1002. While only one securing item 1100 is illustrated in this example, the remaining securing items 1100 can be generally identical in size, structure, and construction. In operation, the securing items 1100 can be inserted through the attachment openings 410.

The securing item 1100 can include an insertion portion 1102. The insertion portion 1102 is an elongated, substantially linearly extending protrusion that can be received within the attachment opening 410. In an example, a cross-sectional size of the insertion portion 1102 can be slightly smaller than the cross-sectional size of the attachment openings 410 such that the insertion portion 1102 can be received therein. In an example, the insertion portion 1102 can include one or more ribs 1103 to assist in limiting inadvertent removal of the securing item 1100 from the attachment openings 410. The ribs can engage, for example, edges of the attachment openings 410 to limit this removal. The insertion portion 1102 comprises any number of lengths, though in an example, the insertion portion 1102 can be long enough to pass through opposing attachment openings 410 in opposing walls of the cover apparatus 200 or the second cover apparatus 700.

The securing item 1100 can include an engagement portion 1104 disposed at an opposite end of the securing item 1100 relative to the insertion portion 1102. The engagement portion 1104 is an elongated, substantially linearly extending protrusion. The engagement portion 1104 is not limited to the dimensions as illustrated, and in other examples, could be longer or shorter in length and/or include a larger or smaller cross-sectional size.

The securing item 1100 can include a pin opening 1106. In the illustrated example, the pin opening 1106 can be positioned between the insertion portion 1102 on one side and the engagement portion 1104 on an opposing second side. The pin opening 1106 in this example has a generally rounded shape, though other shapes are envisioned. For instance, in other examples, the pin opening 1106 can have a larger or smaller size and/or could include other shapes, such as quadrilateral shapes (e.g., square, rectangular, etc.), oval shapes, or the like.

During insertion, the pin opening 1106 can receive the hooked portion 602. In an example, the hooked portion 602 can be moved relative to a pole body 605 of the insulated pole 600. For example, the hooked portion 602 can be moved in the retracting direction 1108 while the pole body 605 can remain relatively stationary. This retraction can improve the gripping performance of the securing item 1100 by the insulated pole 600. Upon retraction, the engagement portion 1104 can contact and engage the pole body 605. This engagement allows for the insertion portion 1102 to extend outwardly from the insulated pole 600 in a direction that is generally perpendicular to a direction along which the insulated pole 600 extends. Accordingly, inadvertent twisting/rotating of the securing item 1100 is limited, along with inadvertent release of the securing item 1100 from the hooked portion 602.

In operation, the insulated pole 600 can grip and hold the securing item 1100, as illustrated. The hooked portion 602 is moved in the retracting direction 1108 until the engagement portion 1104 contacts and engages the pole body 605. At this point, the insertion portion 1102 can extend outwardly from the pole body 605, in a similar direction as illustrated in FIG. 11. The user can then hold and manipulate the insulated pole 600 to insert the securing item 1100 into the attachment openings 410. It will be appreciated that the configuration of the securing item, such as by comprising the engagement portion 1104, allows the securing item 1100 (e.g., as measured along a longest length of the securing item 1100 from a distal end of the engagement portion 1104 to a distal end of the insertion portion 1102) to be substantially perpendicular to a longest length of the pole body 605 when engaged by the insulated pole 600.

This arrangement of the securing item 1100 to the pole 600 allows a user to more easily insert the securing item 1100 into a pair of opposing attachment openings in opposing walls of the cover apparatus 200 or second cover apparatus 700. For example, a user standing on the surface of the material into which the utility pole is mounted may be able to thread the securing item into attachment openings 410. In the absence of the engagement portion 1104, for example, the securing item 1100 may be able to move around and/or otherwise be less secure when engaged by the pole 600, making it more difficult to insert the securing item 1100 into attachment openings 410.

In an example of the absence of the engagement portion 1104, the securing item 1100 may be substantially parallel to the pole 600 (e.g., longest length of securing item 1100 is parallel to (e.g., and extends further along) longest length of the pole body 605). In such an arrangement, it may be difficult for a user standing the surface of the material to insert the securing item 1100 into attachment openings 410. For example, the user may have to be elevated (e.g., via a bucket truck) so that an axis along the length of the pole 600 and the securing item 1100 aligns with an axis passing through a pair of opposing attachment openings in opposing walls of the cover apparatus 200 or second cover apparatus 700 to be able to insert the securing item 1100 into the pair of attachment openings. Thus, the engagement portion 1104 facilitates fewer complexities or requirements to install the securing item 1100. Accordingly, the engagement portion is dimensioned to facilitate an arrangement of the securing item 1100 to the pole 600 to allow more user friendly installation of the securing item 1100 to the cover apparatus 200 and/or second cover apparatus 700.

In operation, the securing item 1100 can be moved along a securing direction 1150 such that the securing item 1100 can be inserted into the first attachment opening 410a and second attachment opening 410b. It is to be appreciated that in FIG. 11, the first attachment opening 410a and second attachment opening 410b are illustrated, together, somewhat generically/schematically as a circular opening. In operation, however, the first attachment opening 410a and second attachment opening 410b can be more similar in structure to the attachment openings illustrated and described previously. The insertion portion 1102 can facilitate placement of the securing item 1100 into the first attachment opening 410a and second attachment opening 410b.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first cover portion and a second cover portion generally correspond to cover portion A and cover portion B or two different or two identical cover portions or the same cover portions.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A cover apparatus for covering an electrical insulator and an electrical conductor, the cover apparatus comprising:
   one or more leg sections configured to cover a portion of the electrical conductor; and
   a cover section coupled to the one or more leg sections and configured to cover a portion of the electrical insulator, the cover section comprising:
   a body portion; and
   an adjustable portion coupled to the body portion at a coupling location, the adjustable portion comprising a plurality of separable sections configured to be removed to adjust a dimension of the adjustable portion according to a dimension of the electrical insulator.

2. The cover apparatus of claim 1, wherein the dimension of the adjustable portion corresponds to a length of the adjustable portion as measured from the coupling location to a distal end of the adjustable portion.

3. The cover apparatus of claim 2, wherein the plurality of separable sections are spaced apart along the length of the adjustable portion.

4. The cover apparatus of claim 3, wherein the length of the adjustable portion is reduced upon removal of a separable section of the plurality of separable sections.

5. The cover apparatus of claim 2, wherein the length of the adjustable portion is substantially perpendicular to an axis along which the electrical conductor extends.

6. The cover apparatus of claim 1, wherein the cover section extends substantially 360 degrees around the portion of the electrical insulator.

7. The cover apparatus of claim 6, wherein the cover section extends along a substantially vertical axis.

8. The cover apparatus of claim 1, wherein the cover section extends substantially 180 degrees around the portion of the electrical insulator.

9. The cover apparatus of claim 8, wherein the cover section extends along a substantially horizontal axis.

10. A cover apparatus for covering an electrical insulator and an electrical conductor, the cover apparatus comprising:
    a first leg section configured to cover a first portion of the electrical conductor;
    a second leg section configured to cover a second portion of the electrical conductor; and
    a cover section coupled to the first leg section and the second leg section and configured to cover a portion of the electrical insulator, the cover section comprising:
    a body portion; and
    an adjustable portion coupled to the body portion at a coupling location, the adjustable portion comprising a plurality of separable sections configured to be removed to adjust a dimension of the adjustable portion according to a dimension of the electrical insulator.

11. The cover apparatus of claim 10, wherein the dimension of the adjustable portion corresponds to a length of the adjustable portion as measured from the coupling location to a distal end of the adjustable portion.

12. The cover apparatus of claim 11, wherein the plurality of separable sections are spaced apart along the length of the adjustable portion such that the length of the adjustable portion is reduced upon removal of a separable section of the plurality of separable sections.

13. The cover apparatus of claim 10, comprising a first gripping structure in a first wall of the first leg section and a second gripping structure in a second wall of the first leg section, the first gripping structure and the second gripping structure configured to facilitate installation of the cover apparatus onto the electrical conductor.

14. The cover apparatus of claim 10, comprising a first securing portion in a first wall of the first leg section and a second securing portion in a second wall of the first leg section, the first securing portion and the second securing portion configured to secure the cover apparatus to the electrical conductor.

15. The cover apparatus of claim 14, wherein a first attachment opening is formed in the first securing portion and a second attachment opening is formed in the second securing portion such that a securing item placed into the first attachment opening and the second attachment opening couples the first securing portion to the second securing portion to secure the cover apparatus to the electrical conductor.

16. The cover apparatus of claim 15, wherein the securing item comprises an insertion portion that facilitates placement of the securing item into the first attachment opening and the second attachment opening.

17. The cover apparatus of claim 14, wherein a relief portion is formed in the first wall of the first leg section adjacent to the first securing portion.

18. A method of forming a cover apparatus for covering an electrical insulator and an electrical conductor, comprising
providing a cover section of the cover apparatus and one or more leg sections of the cover apparatus, wherein the cover section is coupled to the one or more leg sections of the cover apparatus, the cover section configured to cover a portion of the electrical insulator and the one or more leg sections configured to cover a portion of the electrical conductor, the cover section comprising a body portion and an adjustable portion coupled to the body portion at a coupling location, the adjustable portion comprising a plurality of separable sections configured to be removed to adjust a length of the adjustable portion, as measured from the coupling location to a distal end of the adjustable portion, according to a dimension of the electrical insulator; and
removing a separable section of the plurality of separable sections to reduce the length of the adjustable portion according to the dimension of the electrical insulator.

19. The method of claim 18, wherein the removing comprises reducing the length of the adjustable portion in a direction that is substantially perpendicular to an axis along which the electrical conductor extends.

20. The method of claim 18, comprising providing a securing item configured to secure a leg section of the one or more leg sections to the electrical conductor.

* * * * *